2,976,978

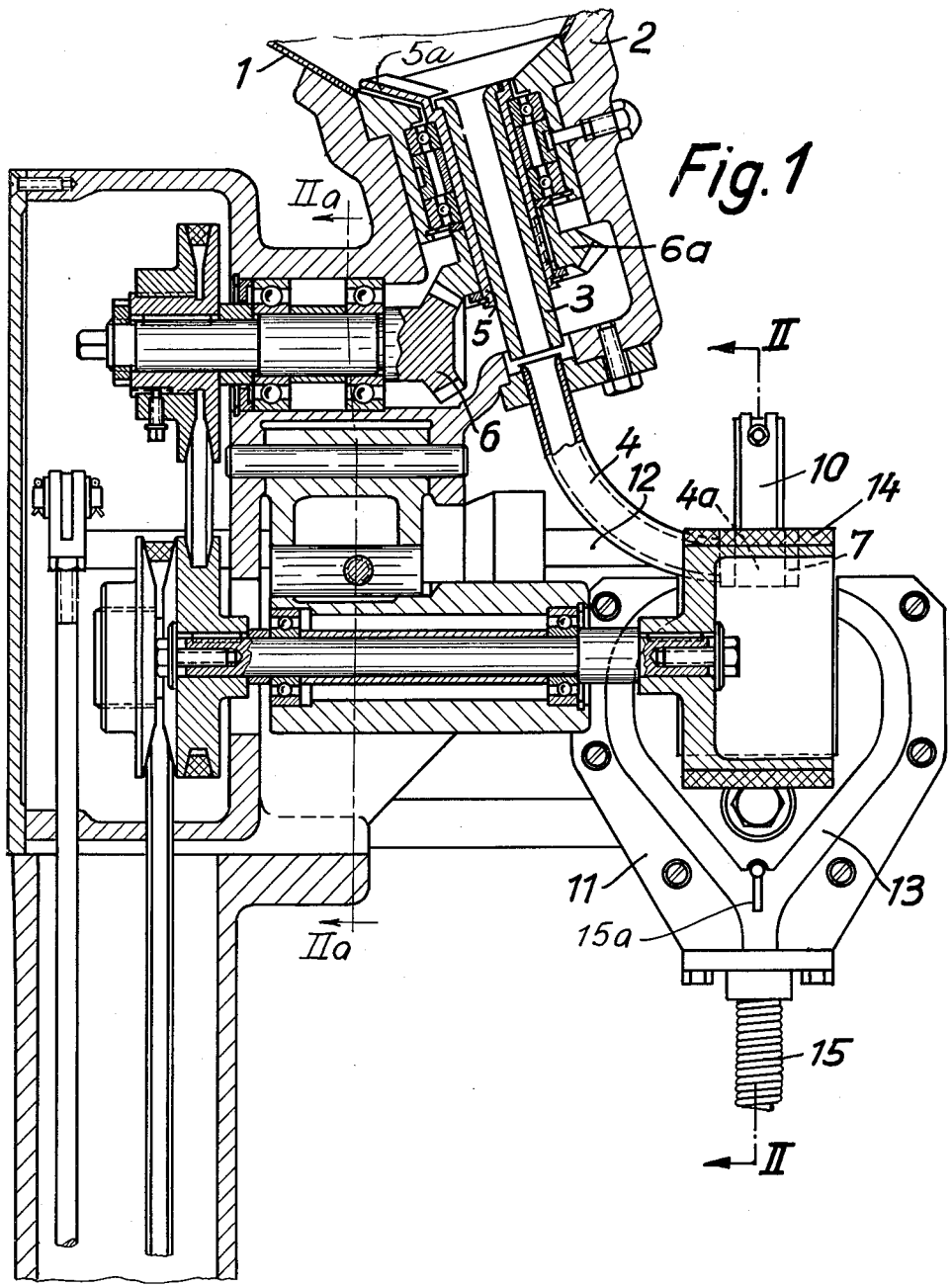

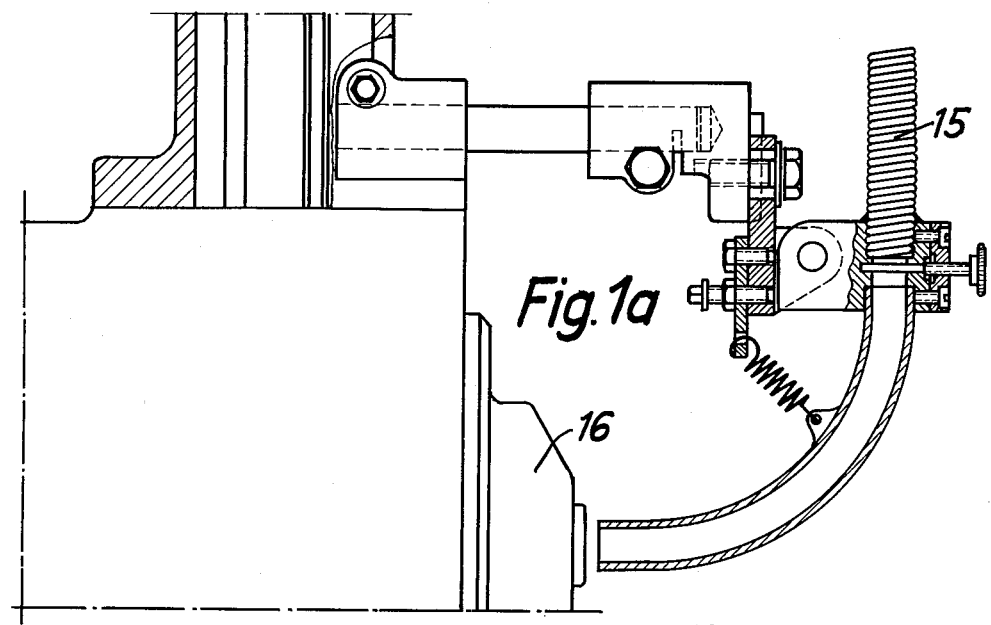
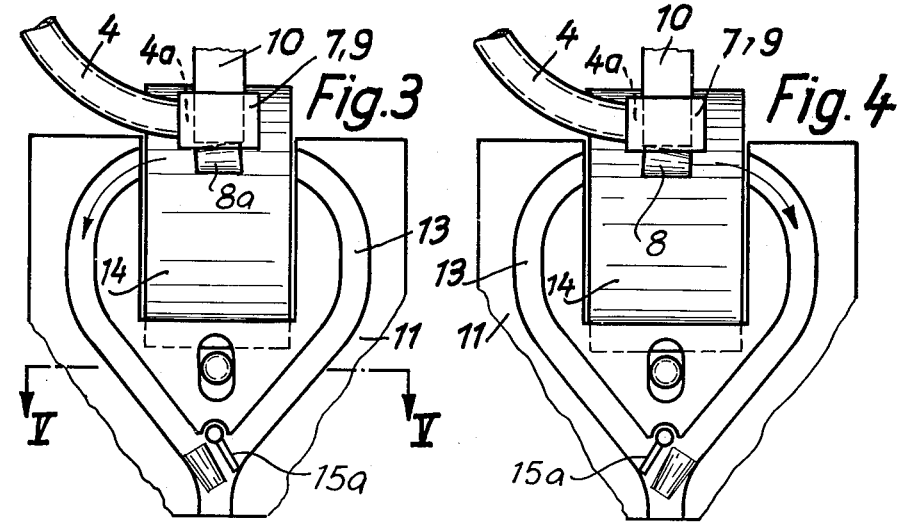
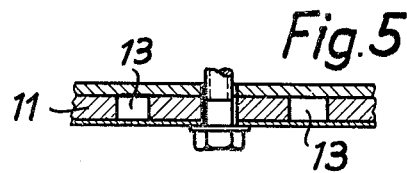

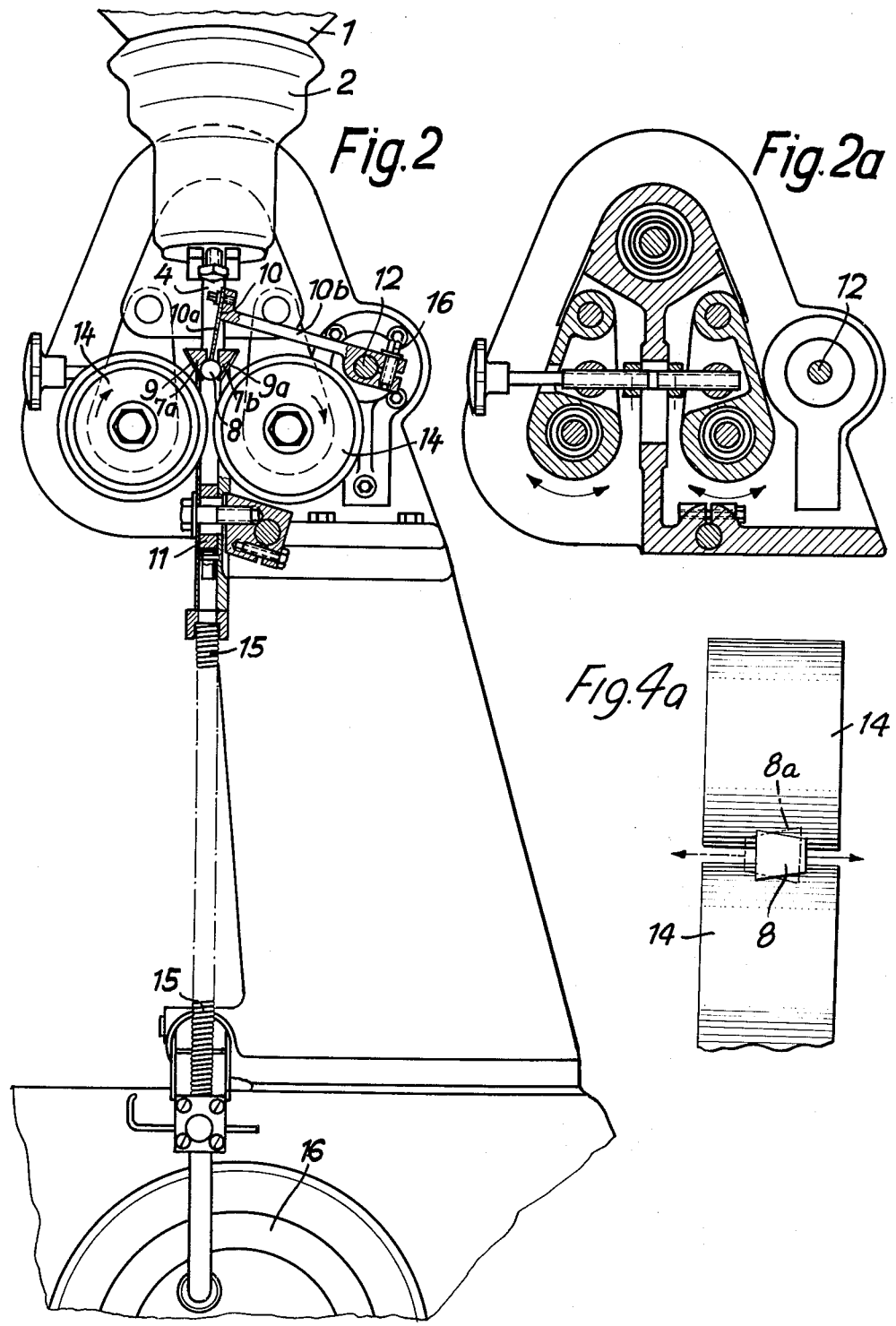

DEVICE FOR FEEDING TAPERED ROLLERS OR THE LIKE INTO GRINDING DEVICES

Karl Hüller, Ludwigsburg, Germany, and Franz Geiger, Steyr-Munichholz, Austria, assignors to Karl Hüller G.m.b.H., Ludwigsburg, Germany Filed Jan. 13, 1959, Ser. No. 786,519

Claims priority, application Germany Jan. 16, 1958

9 Claims. (Cl. 198—33)

The present invention relates to a device for feeding tapered rollers or the like to grinding devices. When feeding tapered rollers into grinding devices, care is always to be taken that these tapered rollers will be fed into the grinding devices or the like in such a way that the thinner end enters the grinding device first. In this way, the rear end of the tapered roller will protrude from the respective chuck of the machine toward the outside and can be crowned by means of a cup wheel as is required for installing these parts in an anti-friction bearing.

In order always to feed the tapered rollers in this way into the machine tool, it has heretofore been the practice to feed the tapered rollers along a steel rail and subsequently to cause the force of gravity to take care of the remaining feeding operation. With such an arrangement, the rollers have their lateral surfaces engage a transversely extending rail, then turn about 90° and, through the intervention of a corresponding guiding tube, enter the machine tool. The said rail was arranged at a certain empirically determined distance from the respective tapered roller to the respective oncoming tapered roller arriving at a point above said rail so that in most instances, due to the location of the center of gravity of said rollers, it was possible to obtain the desired feeding direction of said rollers into the corresponding device. However, arrangements of this type work at very low speed because the turning of the roller due solely to the location of the center of gravity takes a relatively long time. Moreover, it cannot be avoided that from time to time a tapered roller will tip in the wrong direction so that it will enter the machine tool with the narrower portion extending toward the rear instead of toward the front. In such instances, it is necessary to stop the machine tool, to remove the roller from the chuck and to feed it again into the feeding funnel. These additional operations on the part of the operator naturally cause a loss in time which is reflected in a higher cost of production.

Feeding devices for feeding tapered rollers are known in connection with assorting devices which consist of two spaced discs adjustable relative to each other as to their distance from each other. The tapered rollers are fed by a pusher or push rod into the space between said discs in such a way that the tapered rollers will remain suspended by their larger ends between said discs and while said discs rotate will slide tangentially into guiding means by means of which they will be passed into an automatic machine in a properly oriented position.

It is also known to employ devices according to which the tapered rollers are withdrawn from a collecting container by means of a rotary annular disc arranged at an angle with regard to the horizontal. The tapered rollers are removed from the upper marginal portion of said disc by means of two successive strippers so that one roller at a time will pass in the desired position into a guiding means leading to the measuring or working station whereas all other rollers are again returned to the collecting container.

For assorting work pieces of a similar type, it has also been suggested to feed the same into individual stations of a movable feeding device which they can leave in a predetermined position only. It is also known to feed tapered rollers by means of inclined planes over which the said tapered rollers roll off toward the side of their smaller diameter so that the said rollers when leaving the inclined plane will always be directed in the same way.

The various above mentioned heretofore known devices are either relatively complicated and bulky and therefore can be connected to a grinding device to work in an integrated manner therewith only with difficulty, or the working of such devices lacks in precision; or the feeding toward the working station can be effected only very slowly, so that the desired working speed at the grinding device cannot be obtained.

It is, therefore, an object of the present invention to provide a feeding device for the purpose mentioned above, which will overcome the above outlined drawbacks.

It is another object of this invention to provide a feeding arrangement for feeding tapered work pieces which are round in cross section as, for instance, tapered rollers for anti-friction bearings or the like, which will assure that the work pieces will always be fed in a predetermined proper position into a grinding machine.

It is a further object of this invention to provide a feeding device as set forth in the preceding paragraphs, in which the workpieces will pass from a funnel-shaped magazine into a drop conduit ending in a horizontal path and leading into a rotating turning or transporting device by means of which the work pieces will be properly aligned with the smaller diameter of the work piece at the front so it will enter the grinding machine first.

It is still a further object of this invention to provide a feeding arrangement of the type set forth in the preceding paragraphs which will safely avoid any jamming of the assorting device.

These and other objects and advantages of the invention will appear more clearly from the following specification in connection with the accompanying drawings, in which:

Fig. 1 is a side view of and partially a section through a feeding device according to the present invention.

Fig. 1a illustrates partly in view and partly in section the connecting conduit system for connection with the arrangement of Fig. 1.

Fig. 2 is a section taken along the line II—II of Fig. 1.

Figure 2a is a sectional view indicated by line II—IIa on Figure 1 showing an adjustment for adjusting the spacing of the feed drums;

Figure 3 is a view looking in at one of the feed drums showing a tapered roller that has just been fed to the feed drums with its smaller end toward the left;

Figure 4 is a view looking in at one of the feed drums showing a tapered roller that has just been fed to the feed drums with its smaller end toward the right;

Figure 4a is a plan view looking down on top of the feed drums showing a roller in full lines having its small end toward the right as in Figure 4, and a roller in dot-dash lines having its small end toward the left as in Figure 3;

Figure 5 is a sectional view through the heart-shaped guide and is indicated by line V—V on Figure 3.

General arrangement

The arrangement according to the present invention is characterized primarily in that the aligning and transporting or conveying device comprises two drums rotating in the same direction and having their axes arranged parallel to each other. These drums are followed by an assorting device including a heart-shaped guide with two symmetrically arranged tubular sections or branches.

Depending on the starting position of the work pieces, the said assorting device, due to the rotating drums, will feed the work pieces with the smaller diameter thereof at the front from one or the other branch of said heart-shaped guide through an intermediate discharge to the grinding machine.

According to a further feature of the invention, approximately near the end of the conduit, between the two drums there is arranged a charging valve from which the tapered rollers are by means of a pusher, intermittently fed into the space between and above the drums and by which drums the rollers are fed into the upper portion of the heart-shaped tubular guide of the assorting device. In this way, a jamming of the assorting device will be safely avoided.

The charging valve has two symmetrical parts for engagement with the upper portion of the respective tapered roller. The outer surfaces of said parts are inclined and have connected thereto resilient metal strips. These metal strips first hold the individual tapered rollers at the end of the conduit but then move away from each other at the instant the pusher hits the roller whereby said parts release the work piece for movement into the assorting device. The pusher preferably consists of an L-shaped arm mounted on a tiltable shaft.

The heart-shaped tubular feeding means of the assorting device preferably consists of transparant or translucent material so as to allow continuous observation of the work piece passing therethrough.

The above mentioned drums having their axes parallel to each other, are driven in the same direction so that the tapered rollers will be rotated about their own axes. This action yields a velocity vector which rotates the said tapered roller in the upper portion of the assorting device about the axis of the tapered roller in such a way that the tapered roller moves in the direction of its smaller diameter. In order to assure that rollers fed into the drums in both directions will be directed to the grinding machine in the right direction, the heart-shaped tubular guiding means is provided with two branches arranged symmetrically relative to each other, so as to receive the roller from both ends of the drum. The proper movement of the tapered rollers into the assorting device is effected particularly efficiently if the outer wall surfaces of the two drums consist of materials of different friction coefficients. Thus, for instance, the outer wall of one of the drums may consist of steel while the outer wall of the other drum may consist of rubber.

*Structural arrangement*

Referring now to the drawings in detail, the arrangement shown therein comprises a funnel 1 into which the tapered rollers to be machined are loaded. The lower end of funnel 1 is journalled in a charging head 2 having a tube 3 coaxially located therein and establishing communication between funnel 1 and a conduit 4. Tube 3 is located in and connected to a rotary cylindrical bushing 5 one end of which extends into the funnel 1 and is provided with blades 5a.

Rotation of tube 3 and thus of the bladed end thereof may be effected through the intervention of bevel gears 6, 6a and any desired driving means (not shown in the drawings). In this way, those tapered rollers located in the lower portion of the funnel 1 will be caught by the blades 5a and will be caused to move into tube 3 either with the tapered end extending downwardly or upwardly.

After the rollers have passed through tube 3, they will enter conduit or tube 4 which ends in a horizontal section 4a. Arranged in said horizontal section is a charging valve 7 limited by an abutment in axial direction. The said charging valve is provided with symmetrical members 7a, 7b having symmetrically arranged surfaces for engagement with the upper portion of the tapered rollers 8, the outer surfaces of said members 7a, 7b being connected to resilient metal strips 9, 9a respectively. In this way, the tapered roller 8 will be held in the charging valve 7 until a push rod 10 hits against the work piece and feeds the same at a certain rhythm into an assorting device 11. The push rod 10 preferably consists of two arms 10a, 10b connected to each other so as to form an L-shaped lever having its longer arm 10b connected in any convenient manner for instance by clamping bolts 16, to a tiltable shaft 12.

The assorting device 11 comprises a substantially symmetrical heart-shaped tubular guide 13 which may consist of transparent material so that the operator will be able to follow and inspect the movement of the tapered rollers 8 through said assorting device and will be able immediately to remedy any disturbances in the proper feeding if such should occur.

The tapered rollers 8 will drop downwardly from charging valve 7 at certain time intervals depending on the adjustment of the control drum of the machine. The movement of the tapered rollers 8 through the horizontal portion of the tubular guide 13 pertaining to the assorting device 11 is effected by means of two drums 14 arranged adjacent each other in spaced relationship to each other and driven in the same direction. The conical rollers 8 drop upon the upper space between the two rollers 14 which will then engage and rotate said rollers. Due to the different magnitudes of the circumferential surface velocities at the opposite ends of the individual rollers, said differences being caused by the differences in the diameters of the roller ends, a power component in the direction of the roller axis will be produced, and, more specifically, in a direction toward the smaller end of the roller in a way similar to the situation which will occur when a cone or truncated cone-shaped body of rotation engages the surface of a rotating plane disc, whereby the conical or bevel roller will be moved in the direction of its smaller end into one branch of the heart-shaped guide 13.

Figure 4a is a top view of the two feed drums and illustrates that the conical or bevel roller 8 when engaging the two drums will be rotated by the drums and will be conveyed axially in a direction toward the smaller end. If a roller 8a engages the feed drums in the opposite direction, the roller 8a will, as indicated in dash lines, be moved in the opposite direction into the other branch of the heart-shaped guide 13. Thus, by providing the heart-shaped tubular guide 13 with two branches arranged symmetrically with regard to each other it is assured that the tapered rollers, regardless of their direction when dropped to the feed drums, will always pass through said branches with the tapered end downwardly and that the tapered rollers will always be fed into the machine tool in the required proper position.

The two branches of the tubular guide 13 unite in the lower portion of the assorting device 11 and lead into a conduit 15 by means of which the tapered rollers 8, now having their tapered ends all in the front with regard to the direction of movement thereof, will, due to the force of gravity, be fed to the chuck 16 of the grinding machine or another corresponding device. A swing gate 15a positioned where the two branches of the guide join prevents the rollers from turning or jamming as they move downwardly into the vertical channel leading to conduit 15.

The outer cylindrical wall of one of the drums 14 consists of steel, while the outer wall of the other one of the drums 14 is made of rubber. Due to this particular selection of material of the drums, a proper movement of the tapered rollers 8 through the upper portion of the assorting device 11 will be assured. The distance between the two drums 14 is adjustable in conformity with the respective diameters of the tapered rollers. Such an adjustment may be effected in any convenient manner, for instance, by a threaded spindle and nuts meshing therewith and connected to the drums 14 or their shafts.

Figure 2a discloses the adjustable mounting of the two feed drums. The drum axles 17 are journaled in levers 18 which are mounted on joints 19 in housing 20 so as to be tiltable within certain limits. Through a cutout in each of the two levers 18 there is passed a transverse member 21 which has an inner thread and receives a bar having opposite threaded portions 22 and 23. Means 24 hold this bar in a centered position so that adjustment of the threaded bar by means of a handle 24a will change the spacing between the drum axles 17 according to requirement.

It is, of course, to be understood that the present invention is, by no means, limited to the particular construction shown in the drawings but also comprises any modifications within the scope of the appended claims.

What we claim is:

1. In a device for feeding conical work pieces to a machine tool in such a way that the conical work piece enters said machine tool with the smaller diameter end first: a funnel for receiving the conical work pieces to be fed to said machine tool, combined turning and conveying means arranged at a level lower than said funnel, first conduit means leading from said funnel to said turning and conveying means for conveying the work pieces from said funnel into said turning and conveying means, said turning and conveying means including two drums adjustable relative to each other for varying the bite therebetween, said drums having their axes in spaced parallel arrangement to each other, means for rotating said two drums in the same direction, a charging valve over the space between the drums at the end of said first conduit means to receive work pieces therefrom, a pusher associated with the charging valve operable for pushing work pieces intermittently from the valve to the space between the drums, assorting means arranged adjacent said drums for receiving work pieces therefrom, said assorting means including a heart-shaped tube system comprising two branches joined to a discharge at a point remote from said drums, said branches being substantially symmetrically arranged with regard to a vertical plane through said drums transverse to the axes of rotation thereof, and second conduit means leading from said discharge to a desired point of said machine tool.

2. In a device for feeding conical work pieces to a machine tool in such a way that the conical work piece enters said machine tool with the smaller diameter end first: a funnel for receiving the conical work pieces to be fed to said machine tool, combined turning and conveying means arranged at a level lower than said funnel, first conduit means leading from said funnel to said turning and conveying means for conveying the work pieces from said funnel into said turning and conveying means, said turning and conveying means including two drums adjustable relative to each other for varying the bite therebetween, said drums having their axes in spaced parallel arrangement to each other, means for rotating said two drums in the same direction, charging valve means arranged near that end of said first conduit means which is adjacent said turning and conveying means, said charging valve means being arranged above said two drums and therebetween, pusher means adjacent said charging valve means and operable in conformity with the actuation of said drums intermittently to push a work piece out of said charging valve means, assorting means arranged adjacent said drums for receiving work pieces therefrom, said assorting means including a heart-shaped tube system comprising two branches joined to a discharge at a point remote from said drums, said branches being substantially symmetrically arranged with regard to a vertical plane through said drums transverse to the axes of rotation thereof, and second conduit means leading from said discharge to a desired point of said machine tool.

3. In a device for feeding conical work pieces to a machine tool in such a way that the conical work piece enters said machine tool with the smaller diameter end first: a funnel for receiving the conical work pieces to be fed to said machine tool, combined turning and conveying means arranged at a level lower than said funnel, first conduit means leading from said funnel to said turning and conveying means for conveying the work pieces from said funnel into said turning and conveying means, said turning and conveying means including two drums adjustable relative to each other for varying the bite therebetween, said drums having their axes in spaced parallel arrangement to each other, means for rotating said two drums in the same direction, charging valve means arranged near that end of said first conduit means which is adjacent said turning and conveying means, said charging valve means being arranged above said two drums and therebetween and comprising two bars arranged substantially symmetrically to a plane intermediate said two drums and parallel to the axes thereof and also comprising resilient metal strips connected to the outer surfaces of said bars for pressing said bars against the work piece, pusher means adjacent said charging valve means and operable in conformity with the actuation of said drums intermittently to push a work piece out of said charging valve means, assorting means arranged adjacent said drums for receiving work pieces therefrom, said assorting means including a heart-shaped tube system comprising two branches joined to a discharge at a point remote from said drums, said branches being substantially symmetrically arranged with regard to a vertical plane through said drums transverse to the axes of rotation thereof, and second conduit means leading from said discharge to a desired point of said machine tool.

4. In a device for feeding conical work pieces to a machine tool in such a way that the conical work piece enters said machine tool with the smaller diameter end first: a funnel for receiving the conical work pieces to be fed to said machine tool, combined turning and conveying means arranged at a level lower than said funnel, first conduit means leading from said funnel to said turning and conveying means for conveying the work pieces from said funnel into said turning and conveying means, said turning and conveying means including two drums adjustable relative to each other for varying the bite therebetween, said drums having their axes in spaced parallel arrangement to each other, means for rotating said two drums in the same direction, charging valve means arranged near that end of said first conduit means which is adjacent said turning and conveying means, said charging valve means being arranged above said two drums and therebetween, shaft means, means drivingly connected to said shaft means for oscillating same, pusher means adjacent said charging valve means and connected to said shaft means for intermittently pushing a work piece out of said charging valve means, assorting means arranged adjacent said drums for receiving work pieces therefrom, said assorting means including a heart-shaped tube system comprising two branches joined to a discharge at a point remote from said drums, said branches being substantially symmetrically arranged with regard to a vertical plane through said drums transverse to the axes of rotation thereof, and second conduit means leading from said discharge to a desired point of said machine tool.

5. In a device for feeding conical work pieces to a machine tool in such a way that the conical work piece enters said machine tool with the smaller diameter end first: a funnel for receiving the conical work pieces to be fed to said machine tool, combined turning and conveying means arranged at a level lower than said funnel, first conduit means leading from said funnel to said turning and conveying means for conveying the work pieces from said funnel into said turning and conveying means, said turning and conveying means including two drums adjustable relative to each other for varying the bite therebetween, said drums having their axes in spaced parallel arrangement to each other, means for rotating said two drums in the same direction, a charging valve over the space between the drums at the end of said first conduit means to receive work pieces therefrom, a pusher associated with the charging valve operable for pushing work pieces intermittently from the valve to the space between the drums, assorting means arranged adjacent said drums for receiving work pieces therefrom, said assorting means including a heart-shaped tube system comprising two branches made of transparent material and joined to a discharge at a point remote from said drums, said branches being substantially symmetrically arranged with regard to a vertical plane through said drums transverse to the axes of rotation thereof, and second conduit means leading from said discharge to a desired point of said machine tool.

6. In a device for feeding conical work pieces to a machine tool in such a way that the conical work piece enters said machine tool with the smaller diameter end first: a funnel for receiving the conical work pieces to be fed to said machine tool, combined turning and conveying means arranged at a level lower than said funnel, first conduit means leading from said funnel to said turning and conveying means for conveying the work pieces from said funnel into said turning and conveying means, said turning and conveying means including two drums adjustable relative to each other for varying the bite therebetween and respectively having an outer surface of different coefficient of friction, said drums having their axes in spaced parallel arrangement to each other, means for rotating said two drums in the same direction, a charging valve over the space between the drums at the end of said first conduit means to receive work pieces therefrom, a pusher associated with the charging valve operable for pushing work pieces intermittently from the valve to the space between the drums, assorting means arranged adjacent said drums for receiving work pieces therefrom, said assorting means including a heart-shaped tube system comprising two branches joined to a discharge at a point remote from said drums, said branches being substantially symmetrically arranged with regard to a vertical plane through said drums transverse to the axes of rotation thereof, and second conduit means leading from said discharge to a desired point of said machine tool.

7. An arrangement according to claim 6, in which the outer surface of one of said two drums is of steel whereas the outer surface of the other drum is of rubber.

8. In a device for feeding conical work pieces to a machine tool in such a way that the conical work piece enters said machine tool with the smaller diameter end first: a funnel for receiving the conical work pieces to be fed to said machine tool, a tubular member having one end extending into said funnel and equipped with blades, means drivingly connected to said tubular member for rotating the same, combined turning and conveying means arranged at a level lower than the other end of said tubular member, first conduit means leading from said other end of said tubular member to said turning and conveying means for conveying the work pieces from said tubular member into said turning and conveying means, said turning and conveying means including two drums adjustable relative to each other for varying the bite therebetween, said drums having their axes in spaced parallel arrangement to each other, means for rotating said two drums in the same direction, a charging valve over the space between the drums at the end of said first conduit means to receive work pieces therefrom, a pusher associated with the charging valve operable for pushing work pieces intermittently from the valve to the space between the drums, assorting means arranged adjacent said drums for receiving work pieces therefrom, said assorting means including a heart-shaped tube system comprising two branches joined to a discharge at a point remote from said drums, said branches being substantially symmetrically arranged with regard to a vertical plane through said drums transverse to the axes of rotation thereof, and second conduit means leading from said discharge to a desired point of said machine tool.

9. In a device for feeding conical work pieces to a machine tool in such a way that the conical work piece enters said machine tool with the smaller diameter end first: a funnel for receiving the conical work pieces to be fed to said machine tool, combined turning and conveying means arranged at a level lower than said funnel, first conduit means leading from said funnel to said turning and conveying means for conveying the work pieces from said funnel into said turning and conveying means, said turning and conveying means including two drums adjustable relative to each other for varying the bite therebetween, spindle means for adjusting said drums relative to each other, said drums having their axes in spaced parallel arrangement to each other, means for rotating said two drums in the same direction, a charging valve over the space between the drums at the end of said first conduit means to receive work pieces therefrom, a pusher associated with the charging valve operable for pushing work pieces intermittently from the valve to the space between the drums, assorting means arranged adjacent said drums for receiving work pieces therefrom, said assorting means including a heart-shaped tube system comprising two branches joined to a discharge at a point remote from said drums, said branches being substantially symmetrically arranged with regard to a vertical plane through said drums transverse to the axes of rotation thereof, and second conduit means leading from said discharge to a desired point of said machine tool.

References Cited in the file of this patent
UNITED STATES PATENTS

| | | |
|---|---|---|
| 1,334,326 | Strane | Mar. 23, 1920 |
| 1,414,786 | Nagy | May 2, 1922 |
| 1,760,441 | Risser | May 27, 1930 |